United States Patent
Hinds et al.

(10) Patent No.: US 6,216,222 B1
(45) Date of Patent: Apr. 10, 2001

(54) HANDLING EXCEPTIONS IN A PIPELINED DATA PROCESSING APPARATUS

(75) Inventors: Christopher Neal Hinds; David Vivian Jaggar; David Terrence Matheny; Matthew Paul Elwood, all of Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 09/078,595

(22) Filed: May 14, 1998

(51) Int. Cl.[7] .................................................. G06F 9/302
(52) U.S. Cl. ............................... 712/244; 712/222
(58) Field of Search ............................ 712/23, 222, 227, 712/244, 218, 31, 34, 234; 708/505

(56) References Cited

U.S. PATENT DOCUMENTS

| | | | |
|---|---|---|---|
| 4,879,676 | * 11/1989 | Hansen | 708/505 |
| 5,237,700 | * 8/1993 | Johnson et al. | 712/244 |
| 5,341,482 | * 8/1994 | Cutler et al. | 712/244 |
| 5,469,552 | * 11/1995 | Suzuki et al. | 712/244 |
| 5,517,628 | * 5/1996 | Morrison et al. | 712/234 |
| 5,537,559 | * 7/1996 | Kane et al. | 712/244 |
| 5,559,977 | * 9/1996 | Avnon et al. | 712/244 |
| 5,596,733 | * 1/1997 | Worley, Jr. et al. | 712/244 |
| 5,603,047 | * 2/1997 | Caulk, Jr. | 712/23 |
| 5,748,936 | * 5/1998 | Karp et al. | 712/218 |
| 5,774,711 | * 6/1998 | Henry et al. | 712/244 |
| 5,826,070 | * 10/1998 | Olson et al. | 712/222 |
| 5,923,892 | * 7/1999 | Levy | 712/31 |
| 5,983,338 | * 11/1999 | Moyer et al. | 712/34 |
| 6,006,030 | * 12/1999 | Docker | 712/227 |

FOREIGN PATENT DOCUMENTS

| | | |
|---|---|---|
| 0 588 252 | 3/1994 | (EP) . |
| 0 779 577 | 6/1997 | (EP) . |
| 0 936 541 | 8/1999 | (EP) . |
| 2 284 493 | 6/1995 | (GB) . |
| 2 294 341 | 4/1996 | (GB) . |
| 2 310 740 | 9/1997 | (GB) . |

* cited by examiner

Primary Examiner—Meng-Al T. An
Assistant Examiner—Jungwon Chang
(74) Attorney, Agent, or Firm—Nixon & Vanderhye P.C.

(57) ABSTRACT

A data processing apparatus and method is provided, the apparatus comprising an execution unit having a plurality of pipelined stages for executing instructions, such that a maximum of 'n' instructions can be being executed simultaneously within the execution unit. Further, a set of at least 'n' logical exception registers are provided, each exception register being capable of storing a number of exception attributes associated with an instruction for which an exception has been detected during execution by the execution unit. In the event of an exception being detected during execution of a first instruction, the execution unit is arranged to: (i) store in a first of said exception registers said exception attributes associated with said first instruction; and (ii) to continue executing any remaining instructions already in the pipelined stages at the time the exception was detected. The execution unit is further arranged to store in said exception registers the exception attributes associated with any of the remaining instructions for which an exception is detected during execution, whereby the exception attributes stored in the exception registers can be provided to an exception processing tool for use in recovering from any exceptions occurring during processing of said first instruction and said remaining instructions. By this approach, when the exception processing tool is invoked, then it can deal with any exceptions arising from the instructions executed by the pipeline, and the data processing apparatus can then continue with the next instruction, without the need to re-execute any of the instructions that were in the pipeline at the time the first exception was detected.

18 Claims, 5 Drawing Sheets

HANDLING EXCEPTIONS IN A PIPELINED DATA PROCESSING APPARATUS

BACKGROUND OF THE INVENTION

1. Field of the Invention

The present invention relates to techniques for handling exceptions in a data processing apparatus, and in particular to a data processing apparatus and method for handling exceptions in situations where multiple instructions can be executed simultaneously in a plurality of pipelined stages of an execution unit.

2. Description of the Prior Art

In a data processing apparatus, it is known to provide one or more dedicated processing units adapted to perform particular processing tasks. For example, a floating point unit may be provided to perform a particular floating point operation, for example a multiply-accumulate operation. Such dedicated processing units may be part of the main processor, or may be provided within a separate coprocessor.

If the operation to be performed by such a dedicated processing unit can be broken down into a number of separate steps, it is common to provide a number of pipelined processing stages within the processing unit. By such an approach, it is possible for a number of instructions to be executed simultaneously within the processing unit. As an instruction is passed into the pipeline, the processing unit will typically retrieve the source data required for the instruction from a data register file, and on completion of the instruction, will store the data result to a predetermined destination register.

When executing such instructions, it is possible that an exception condition may be detected by the processing unit, and in such a situation it is typically necessary to invoke an exception processing tool to deal with the exception, in order to ensure that an appropriate data result is placed in the destination register.

However, in pipelined architectures, the detection of an exception condition may occur later than required to stop the issue of subsequent instructions into the pipeline. Such instructions must be either completed or restarted. A number of prior art techniques have been proposed for dealing with this problem.

Firstly, the problem can be avoided by ensuring that any instruction entering the pipeline which may give rise to an exception condition is completed before any subsequent instruction is allowed to enter the pipeline. Such an approach was employed in the Motorola MC68881 chip, where the CPU was only permitted to issue a subsequent instruction when the current instruction completed.

An alternative approach is to provide a significant area of memory, referred to as a state frame, in which all intermediate states in the pipeline can be stored as and when required. Thus, if an exception condition is detected, and hence the exception processing tool needs to be invoked to recover from the exception, then the state of all stages of the pipeline can be stored in the state frame, such that the pipeline can be restored to its previous state once the exception processing tool has completed the recovery process. Such an approach was employed in the Motorola MC68040 chip. This approach suffers from the drawback that an instruction, when exceptional, blocks completion of all subsequent instructions currently executing in the pipeline. Further, this technique is significantly more complex than the single issue technique discussed previously, and requires significant time to process a store or load of an exceptional state to or from memory.

A further approach employed in prior art processing units involves the use of a history, or reorder, buffer. The reorder buffer typically stores the entire instruction stream of the data processing apparatus, and has logic arranged to send the instructions to the appropriate processing unit(s) of the data processing apparatus, and to subsequently place in the reorder buffer in association with the instruction the data result determined upon execution of that instruction. As each instruction reaches the bottom of the reorder buffer, it is "retired", for example by storing the data result in the appropriate destination register. If, however, an exception condition is associated with the instruction being retired, then the exception processing tool is invoked to recover from the exception. Subsequent to the recovery process, the instruction stream is restarted from the instruction immediately following the retired instruction.

Since exception conditions are quite rare, the reorder buffer can provide good performance, although there is clearly a significant performance hit when an exception does occur, since then all subsequent instructions being executed by all processing units (not just the processing unit handling the exceptional instruction) are re-executed. Further, reorder buffers are of significantly greater complexity and greater chip area than either of the two previously discussed techniques.

It is an object of the present invention to provide a data processing apparatus and method which enables more efficient processing of exception conditions in situations where several instructions may be executed simultaneously within a dedicated processing unit.

SUMMARY OF THE INVENTION

Accordingly, the present invention provides a data processing apparatus, comprising: an execution unit comprising a plurality of pipelined stages for executing instructions, such that a maximum of 'n' instructions can be being executed simultaneously within the execution unit; a set of at least 'n' logical exception registers, each exception register being capable of storing a number of exception attributes associated with an instruction for which an exception has been detected during execution by the execution unit; in the event of an exception being detected during execution of a first instruction, the execution unit being arranged to: (i) store in a first of said exception registers said exception attributes associated with said first instruction; and (ii) to continue executing any remaining instructions already in the pipelined stages at the time the exception was detected, the execution unit further being arranged to store in said exception registers the exception attributes associated with any of said remaining instructions for which an exception is detected during execution; whereby the exception attributes stored in the exception registers can be provided to an exception processing tool for use in recovering from any exceptions occurring during processing of said first instruction and said remaining instructions.

In accordance with the present invention, when an exception is detected, exception attributes associated with the instruction giving rise to the exception are stored in an exception register, and the remaining instructions in the pipelined stages are allowed to continue to be executed. If any of these remaining instructions also give rise to an exception, then the exception attributes associated with those instructions are also stored in exception registers. By this approach, when the exception processing tool is invoked, then it can deal with any exceptions arising from the instructions executed by the pipeline. This has the benefit that, once the exceptions have been dealt with, then the data processing apparatus can continue with the next instruction, without the need to re-execute any of the instructions that were in the pipeline at the time the first exception was detected. Further, any other processing units of the data processing system will not need to re-execute any instructions which were executed after the first exceptional instruction. Additionally, there is not the need to expend significant time storing to memory the state of the pipeline at the time the first exception was detected.

The data processing apparatus has at least 'n' logical exception registers for storing exception attributes. These may be 'n' physically separate registers, or alternatively be provided as portions of a smaller number of larger physical registers. For example, four 32-bit exception registers could be provided by four separate 32-bit registers or be provided within two 64-bit registers.

The exception processing tool may be provided as part of the data processing apparatus, or can be provided separately. In preferred embodiments, the data processing apparatus has an exception processing tool provided for receiving the exception attributes from the exception registers, and for applying predetermined operations to recover from said exceptions arising during processing of said first instruction and said remaining instructions.

It will be appreciated by those skilled in the art that there are many ways in which the exception processing tool could be invoked upon detection of an exception. For example, the data processing apparatus could issue an exception signal as soon as the exception is detected in order to cause the exception processing tool to be invoked. However, in preferred embodiments, upon detection of the exception in said first instruction, the data processing apparatus issues an exception signal when a further instruction is passed to the execution unit for execution, the exception signal causing said exception processing tool to be invoked. In preferred embodiments, when the exception processing tool has completed the predetermined operations employed to recover from the exceptions arising during processing of said first instruction and said remaining instructions, the execution unit is arranged to begin processing instructions with said further instruction.

In preferred embodiments, the data processing apparatus further comprises a set of data registers for storing source data required by the execution unit to execute said instructions and result data determined after executing said instructions. In such preferred embodiments, the exception processing tool is preferably arranged to overwrite any result data stored by the execution unit upon executing an instruction for which an exception is detected with corrected data determined by the exception processing tool.

Preferably, the data processing apparatus further comprises a decoder for decoding an instruction to be executed by the execution unit, and for passing the decoded instruction to the execution unit.

It will be appreciated that the execution unit may be provided in a number of different places within the data processing apparatus. For example, it may be provided as a particular logic unit within a main processor, e.g. an Arithmetic Logic Unit (ALU) of a CPU, or may be provided within a separate coprocessor. In preferred embodiments, the data processing apparatus comprises a main processor and a coprocessor, the coprocessor comprising said execution unit and said set of exception registers, and being arranged to execute instructions received from the main processor.

Following detection of the exception in said first instruction, then in preferred embodiments the coprocessor is arranged to issue an exception signal to the main processor when the main processor next sends an instruction to the coprocessor for execution, the exception signal causing the main processor to invoke said exception processing tool.

It will be appreciated by those skilled in the art that the exception processing tool can be embodied in software or hardware, or a combination of both hardware and software. However, in preferred embodiments, the exception processing tool is embodied as exception support code executed by the main processor.

In accordance with the present invention, the coprocessor can be arranged to perform any pipelined processing operation. However, in preferred embodiments, the coprocessor is a floating point unit.

In preferred embodiments, a number of different exceptions may be detected during execution of the instructions by the execution unit. For example, the exception may be an overflow exception to indicate that the data result of the instruction as determined by the execution unit exceeds a predetermined numerical range, and the exception attributes stored in the exception register identify at least an exception type and said data result.

Alternatively, the exception may be an underflow exception to indicate that the data result of the instruction as determined by the execution unit is less than a predetermined numerical range, and the exception attributes stored in the exception register identify at least an exception type, said data result and any additionally required rounding bits. These rounding bits may be used to identify any rounding applied by the execution unit, or to compute the necessary rounding of the result determined by the exception processing tool.

A further exception may be an invalid operation exception, and the exception attributes stored in the exception register identify at least an exception type, the operation type of the instruction, and the source data for the instruction. Alternatively, the exception may be an unsupported operand exception, and the exception attributes stored in the exception register again identify at least an exception type, the operation type of the instruction, and the source data for the instruction.

Another example of an exception which may be detected is a divide by zero exception to indicate that the instruction is seeking to divide a number by zero, and in this case the exception attributes stored in the exception register identify at least an exception type and sign information of the source data for the instruction.

Viewed from a second aspect, the present invention provides a method of operating a data processing apparatus, comprising the steps of executing instructions in a plurality of pipelined stages of an execution unit, such that a maximum of 'n' instructions can be being executed simultaneously within the execution unit; providing at least 'n' logical exception registers, each exception register being capable of storing a number of exception attributes associated with an instruction for which an exception has been detected during execution by the execution unit; storing in a first of said exception registers said exception attributes associated with a first instruction for which an exception has been detected during execution of said first instruction; continuing execution of any remaining instructions already in the pipelined stages at the time said exception was detected; storing in said exception registers the exception attributes associated with any of said remaining instructions for which an exception is detected during execution; providing the exception attributes stored in the exception registers to an exception processing tool for use in recovering from any exceptions occurring during processing of said first instruction and said remaining instructions.

BRIEF DESCRIPTION OF THE DRAWINGS

The present invention will be described, further by way of example only, with reference to a preferred embodiment thereof as illustrated in the accompanying drawings, in which.

DESCRIPTION OF A PREFERRED EMBODIMENT

Figure 1:
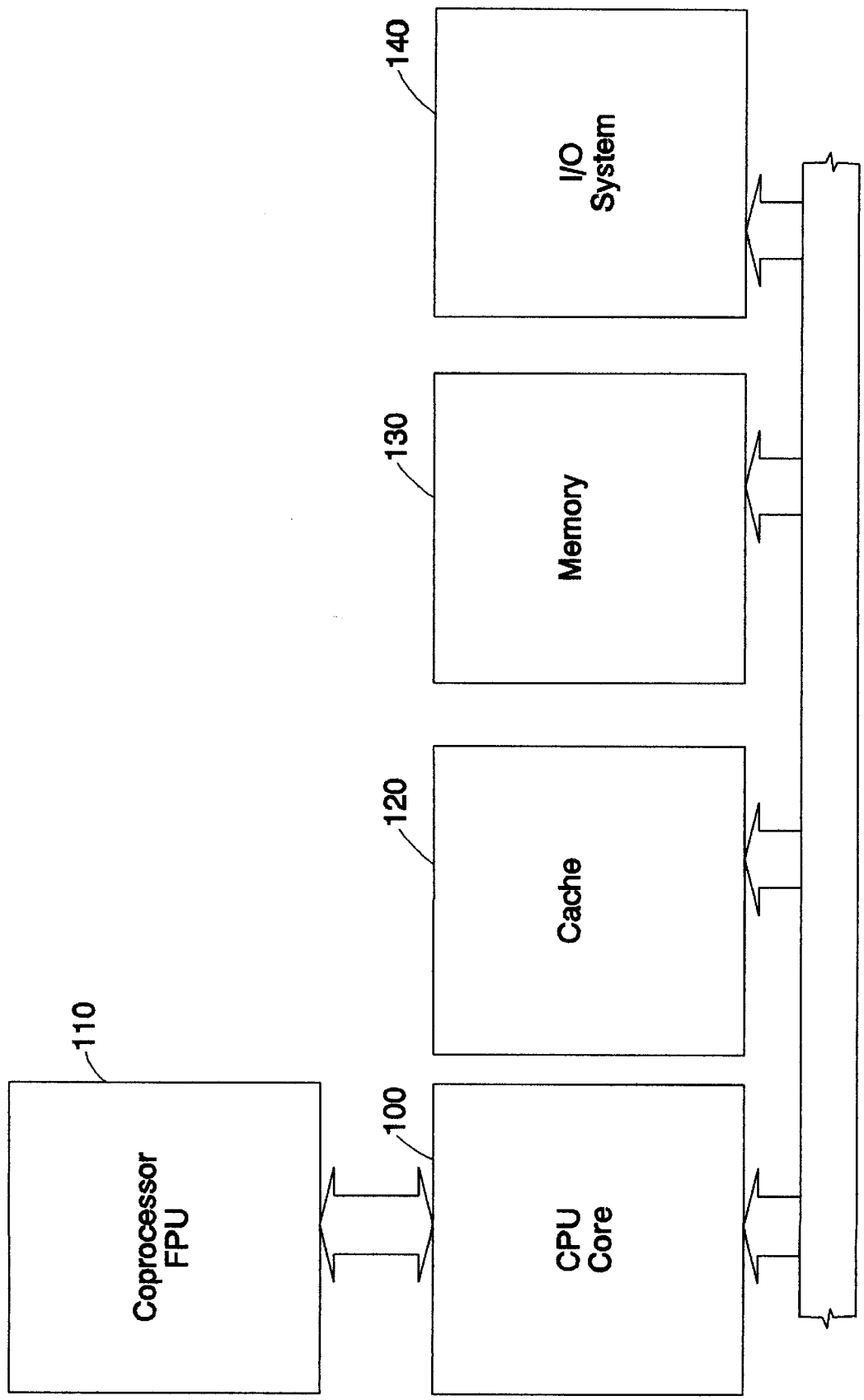
FIG. 1 is a block diagram illustrating elements of a data processing apparatus in accordance with preferred embodiments of the present invention.

FIG. 1 is a block diagram illustrating various elements of a data processing apparatus in accordance with the preferred embodiment of the present invention. The CPU core 100 is arranged to execute instructions retrieved from memory 130 or cache 120, the data required for those instructions also being retrieved from memory 130 or cache 120. Further, a coprocessor floating point unit (FPU) 110 is provided, and the CPU core 100 is arranged to send appropriate floating point instructions to the FPU 110 for execution rather than executing those instructions within the CPU core. The data resulting from the executed instructions is stored in registers provided within the CPU 100 or FPU 110, and subsequently written to the cache 120 and/or the memory 130. Further, the data processing apparatus is connectable to external devices via an input/output (I/O) system 140.

The FPU 110 in accordance with a first embodiment of the present invention will now be described in more detail with reference to FIG. 2. As illustrated, an execution unit 200 is provided having a number of pipelined stages, in this example, there being four pipelined stages E1, E2, E3 and E4. As each instruction is received by the FPU 110 from the CPU 100, it is decoded by a decoder 210 and then passed to the execution unit 200. In preferred embodiments, the FPU 110 will at this stage send a signal back to the CPU 100 to indicate acceptance of the instruction even though the instruction has not yet been executed. This enables the CPU 100 to continue operation.

As a decoded instruction enters the first stage of the pipeline E1, the source data required to execute that instruction is retrieved from the appropriate register(s) in the register file 240, and the various steps required to execute the instruction are performed within the pipelined stages of the execution unit. Upon completion of the instruction at stage E4, the data result is stored to a specified destination register within the register file 240. In preferred embodiments, there will be 32 registers in the register file 240, but clearly more or less registers can be provided as required.

In accordance with the first embodiment of the invention, a number of exception status registers 230 are provided for storing exception attributes associated with instructions for which exceptions are detected during execution by the execution unit 200. As an example, an overflow exception may be detected in stage E4, in the event that the data result exceeds a predetermined numerical range. Although the execution unit 200 may still store data in the destination register, for example the mantissa and a modified exponent, an exception needs to be generated to indicate that the data result stored in the destination register is only an intermediate result and needs correcting.

If an exception is detected, then a number of exception attributes will be stored in a first register of the exception status registers 230. The exact exception attributes stored in preferred embodiments will be discussed in more detail later.

Once an exception has been detected, no further instructions are allowed to enter the pipeline, but any instructions already being processed in the pipeline (e.g. in stages E1, E2 or E3) are allowed to complete. When a further instruction is received at the decoder 210 from the CPU 100, then in preferred embodiments the FPU 110 is arranged to return an exception signal to the CPU to cause the CPU to activate an exception processing tool. In preferred embodiments, this exception signal takes the form of an abort signal sent in response to receipt of this further instruction. Such an abort signal causes the CPU 100 to activate the exception processing tool.

If during execution of any of the remaining instructions in the pipeline, further exceptions are detected, then exception attributes required to later recover from these exceptions are also stored in further exception status registers 230. By this approach, when the exception processing tool is invoked, it can deal with any exceptions arising from the instructions executed by the pipeline. This has the benefit that, once the exceptions have been dealt with, then the data processing apparatus can continue with the next instruction, without the need to re-execute any of the instructions that were in the pipeline at the time the first exception was detected, or indeed any other instructions handled by the CPU or other coprocessors, and without the requirement for a large delay to store the state of the pipeline after the first exception was detected.

In addition to exceptions that are detected during processing of the instructions, certain exceptions, referred to as input exceptions, can be detected before the instruction is actually executed. An example of such an input exception is an invalid operation exception. Hence, as a decoded instruction enters the first stage of the pipeline E1, the execution unit preferably performs a number of checks to determine whether the instruction is clearly going to cause an exception to be generated. If such an input exception is detected, then the appropriate exception attributes are stored in an exception status register 230. Additionally, to enable such an input exception to be processed by the exception processing tool, the instruction needs to be available. In the first embodiment illustrated in FIG. 2, this is achieved by the decoded instruction being stored in an input exception register 220 at the same time as the decoded instruction is passed to the first stage E1 of the execution unit 200.

In preferred embodiments, there are six types of exception which may be detected by the FPU 110, thus causing the exception processing tool to be invoked. These exceptions are: overflow (OF), underflow (UF), inexact (IX), invalid operation (IO), divide-by-zero (DZ) and unsupported operand (UO). IO, DZ and UO exceptions are input exceptions detectable before the instructions are executed, whereas OF, UF and IX exceptions are in preferred embodiments detected during processing of the instructions, typically in stage E4. Alternatively, OF and UF exceptions may be detected as input exceptions pessimistically, for example by reviewing the exponents of the source data.

To enable these exceptions to be dealt with by the exception processing tool, the following information is stored within an exception status register 230 each time such an exception is detected: The exception type (3 bits are sufficient to specify the six exception types), A pointer to the destination register (5 bits are sufficient to specify any of the 32 registers); An indication of the precision of the instruction (1 bit required to identify single or double precision); and Rounding bits required for UF exception (2 bits are required in preferred embodiments).

In addition, for input exceptions, the instruction giving rise to the input exception will be stored in the input exception register 220. Further, a general control register within the FPU 110 (not shown) will contain details of the rounding mode (RM) applied by the execution unit 200 of the FPU 110, and the exception processing tool will have access to the RM information when reviewing any intermediate result data placed in the destination register by the execution unit 200.

Figure 2:
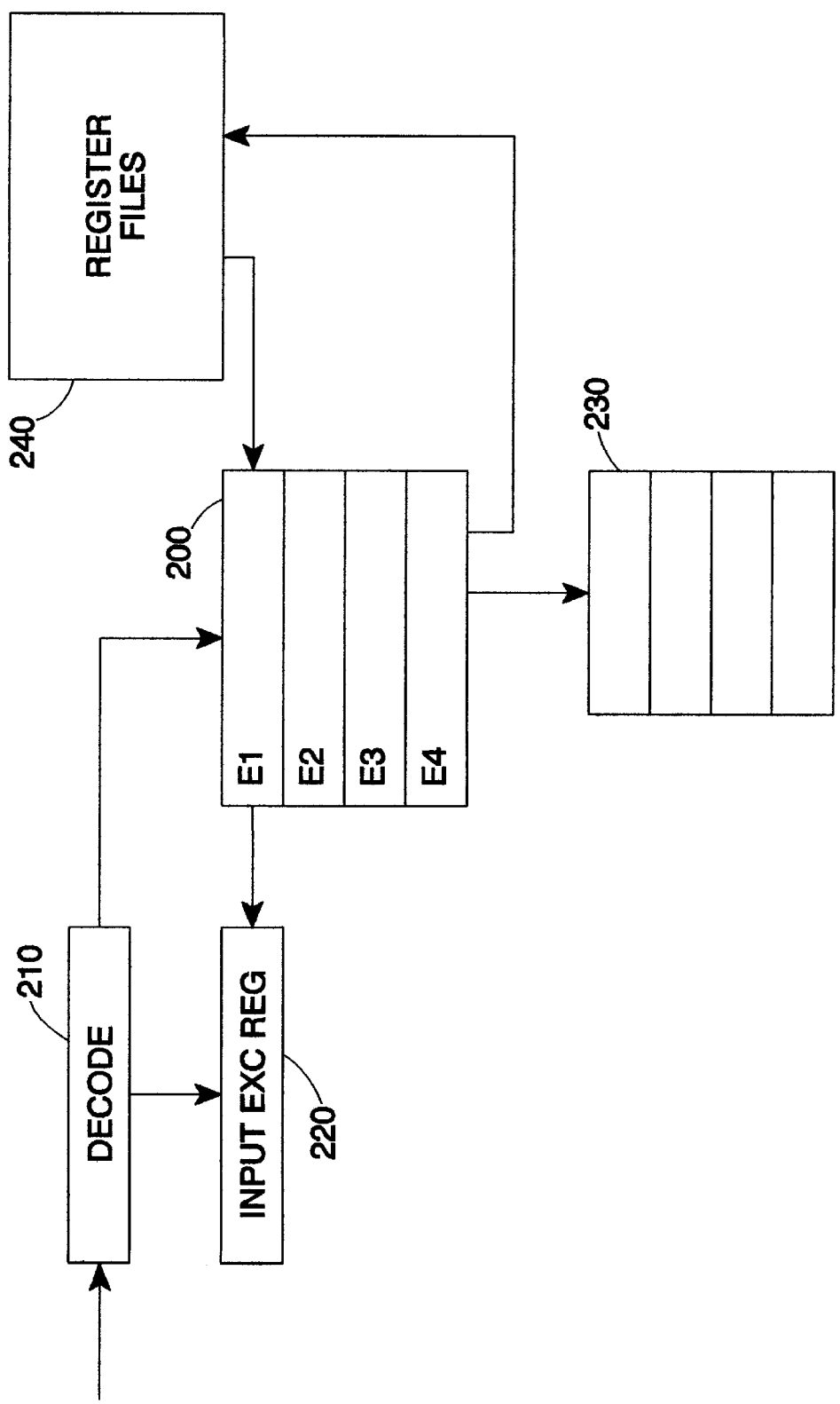
FIG. 2 is a block diagram illustrating elements of a coprocessor in accordance with a first embodiment of the present invention.
Figure 3:
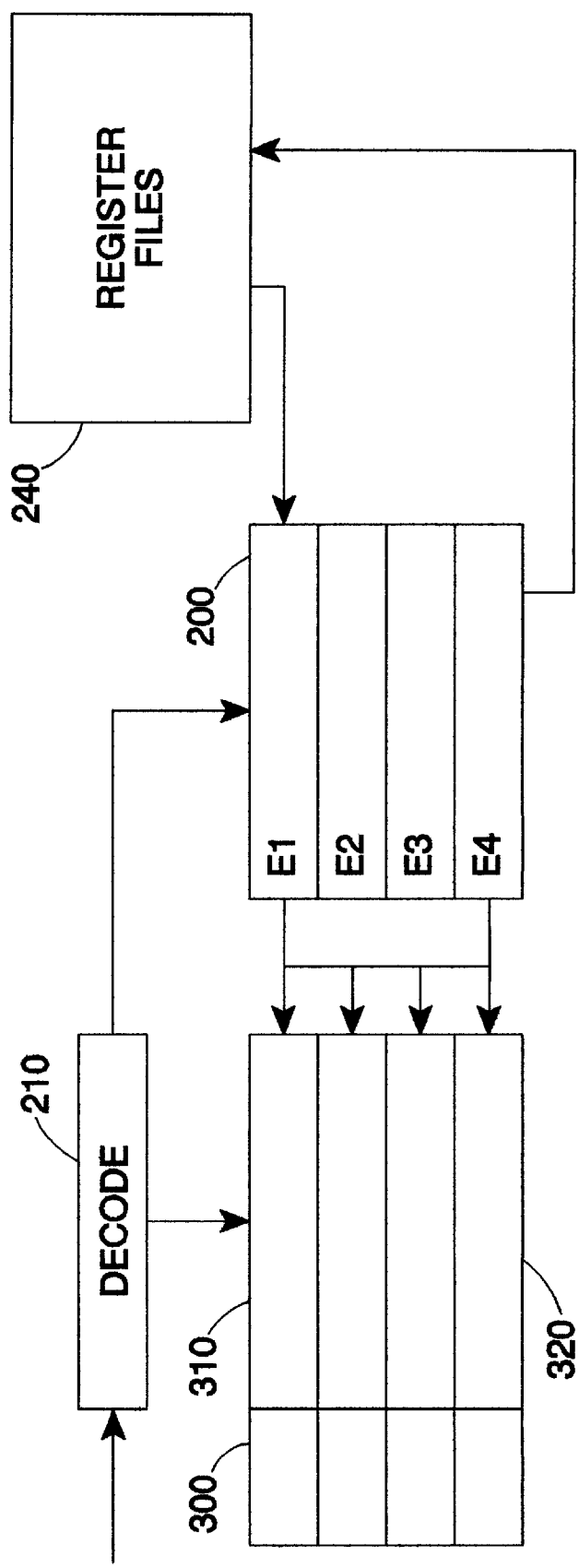
FIG. 3 is a block diagram illustrating elements of a coprocessor in accordance with second embodiment of the present invention.

An alternative embodiment for the FPU 110 is illustrated in FIG. 3, in which the elements common to the FIG. 2 embodiment are indicated with the same reference numerals. In this embodiment, the exception registers take the form of exception registers 320, each exceptions register having a first portion 310 for storing instructions, and a second portion 300 for storing additional exception attributes.

As a first instruction is decoded by the decoder 210 and passed to the execution unit 200, the instruction is also copied into the portion 310 of a first exception register 320, which can be considered logically to be the top exception register as illustrated in FIG. 3. When the first instruction passes from stage E1 to E2, the logical position of the first exception register is changed to map the progress of the instruction through the pipeline, and the new top exception register is then used to store the next instruction passed to stage E1 of the pipeline. Assuming the first instruction passes through the pipeline without causing an exception to be detected, then the data result is stored in the appropriate destination register within the register file 240, and the first exception register can then be reused for a new instruction.

If any particular instruction gives rise to an exception, then the second portion 300 of the corresponding exception register 320 is used to store additional exception attributes. With reference to the description of FIG. 2, the same information is required. However, the instruction stored in the first portion 310 already provides a pointer to the destination register, an indication of the precision of the instruction, and the opcode, and hence all that needs to be stored in the second portion 300 is the exception type and, if appropriate, the rounding bits required for a UF exception.

In preferred embodiments, input exceptions will be detected at stage E1 and other exceptions will typically be detected at stage E4. The first exception detected causes the necessary additional exception attributes to be stored in the additional portion 300 of the relevant exception register 320. No further instructions are then allowed into the pipeline, whilst the remaining instructions already in the pipeline are allowed to complete. If the instructions complete successfully, the data result will be written back to the appropriate destination register without any additional exception attributes being stored in the portion 300 of the relevant exception register 320. However, if any of these remaining instructions also give rise to exceptions, then the necessary additional exception attributes are also stored in the additional portion 300 of the relevant exception register (s) 320. When the next instruction received by the FPU 110 causes an abort signal to be passed to the CPU 100, and the exception processing tool is then invoked, the exception processing tool will be able to deal with all exceptions arising from these instructions.

Preferably, the exception registers 320 are reordered such that those containing exceptions are logically positioned adjacent each other. By this approach, it is not necessary for the exception processing tool to read all exceptions registers 320 unless they all contain exceptions. Instead, when the exception processing tool is invoked, it only needs to continue reading the exception registers until it reaches one that has no exception in it. All remaining exception registers are then assumed also not to contain exceptions.

As a third embodiment that can be applied to either the arrangement of FIG. 2 or FIG. 3, the exception type information can be stored separately in an exception register arranged to hold the exception types for all exceptions detected, with pointers being used to point to the relevant exception registers storing the remaining exception attributes. In this instance, the exception processing tool would simply look at each exception type within the exception register in turn, and retrieve the additional exception attributes as and when required. As soon as an empty field in that exception register is reached, all exceptions are considered to have been handled, and normal processing is resumed. The operation of the exception processing tool will be discussed in more detail later with reference to FIG. 5.

Figure 4:
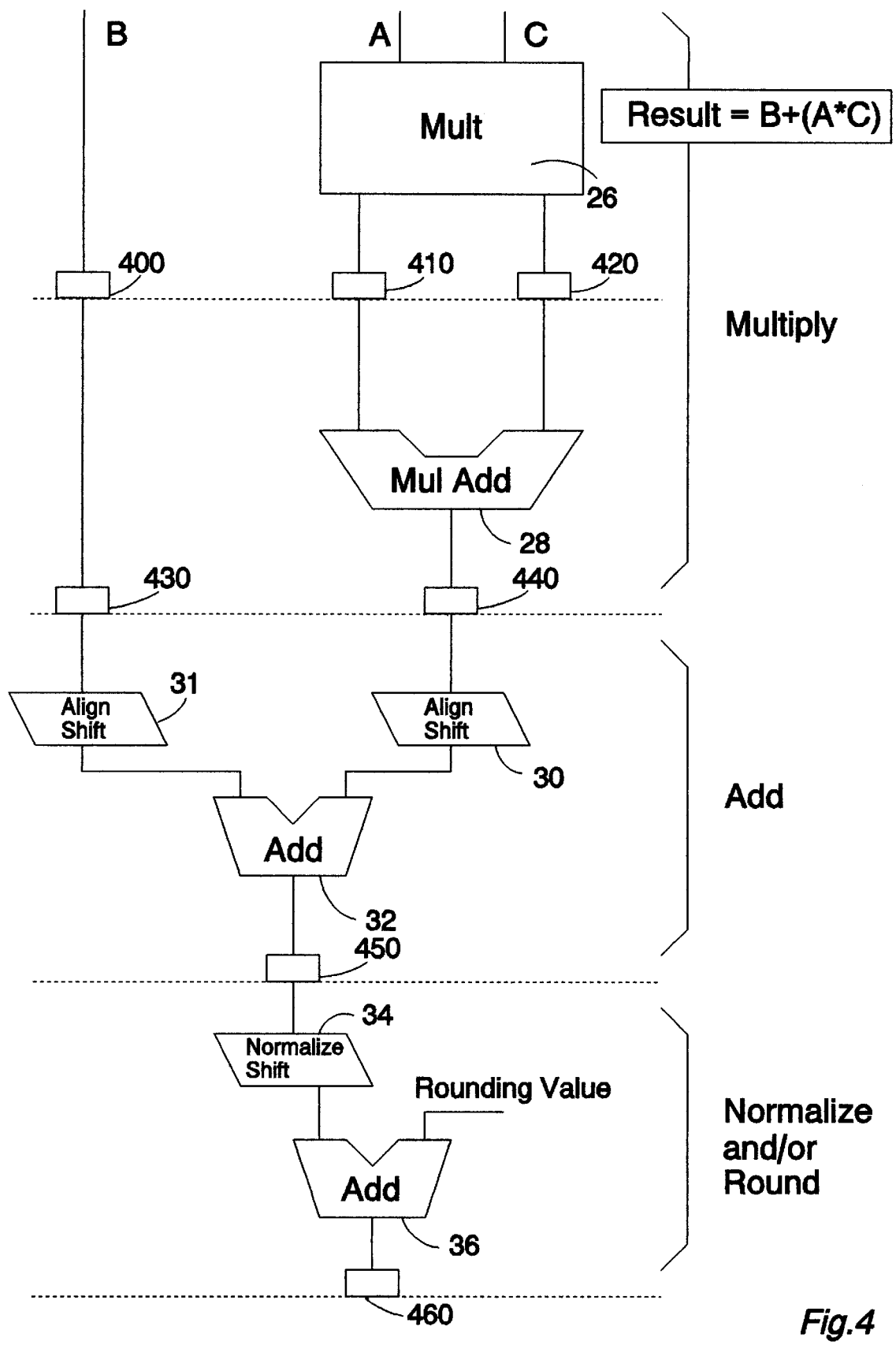
FIG. 4 is a block diagram providing an example of an execution unit having a number of pipelined stages.

An example of a possible four stage pipeline process that may be performed by the FPU 110 of preferred embodiments is illustrated in FIG. 4. The logic illustrated in FIG. 4 performs a multiply-accumulate operation, such that the result $=B+(A \times C)$. It will be appreciated that the logic can also perform a straightforward add operation by setting the input C to 1, or can perform a straightforward multiply operation by setting the input B to 0. Further, it will be appreciated by those skilled in the art that such logic can be supplemented to enable division to also be performed. However, for ease of illustration, this additional logic has not be shown.

As shown in FIG. 4, the first stage E1 consists of a multiplier 26 which performs the multiplication $A \times C$, providing the output in carry save format to the latches 410 and 420, respectively. Meanwhile, the input B is stored in latch 400. Then, at stage E2, the adder 28 adds the values stored in latches 410 and 420, the result being stored in latch 440. Also, during stage E2, the input B is stored in latch 430.

In stage E3, the values stored in latches 430 and 440 are passed through align/shift logic 31, 30, respectively, to enable both values to be aligned with respect to each other, and then the values are added by adder 32, with the result being stored in latch 450. Then, at stage E4, the result is passed through a normalize/shift logic 34, to enable any normalization required to be performed, and the value is then provided to one input of an adder 36. The other input of the adder 36 is a rounding value, which when formed causes the output of the adder 36 to represent a rounded data value. The rounding value is formed when the result of the normalize/shift logic 34 requires an adjustment to be correct. The output from the adder is then latched in the latch 460.

Figure 5:
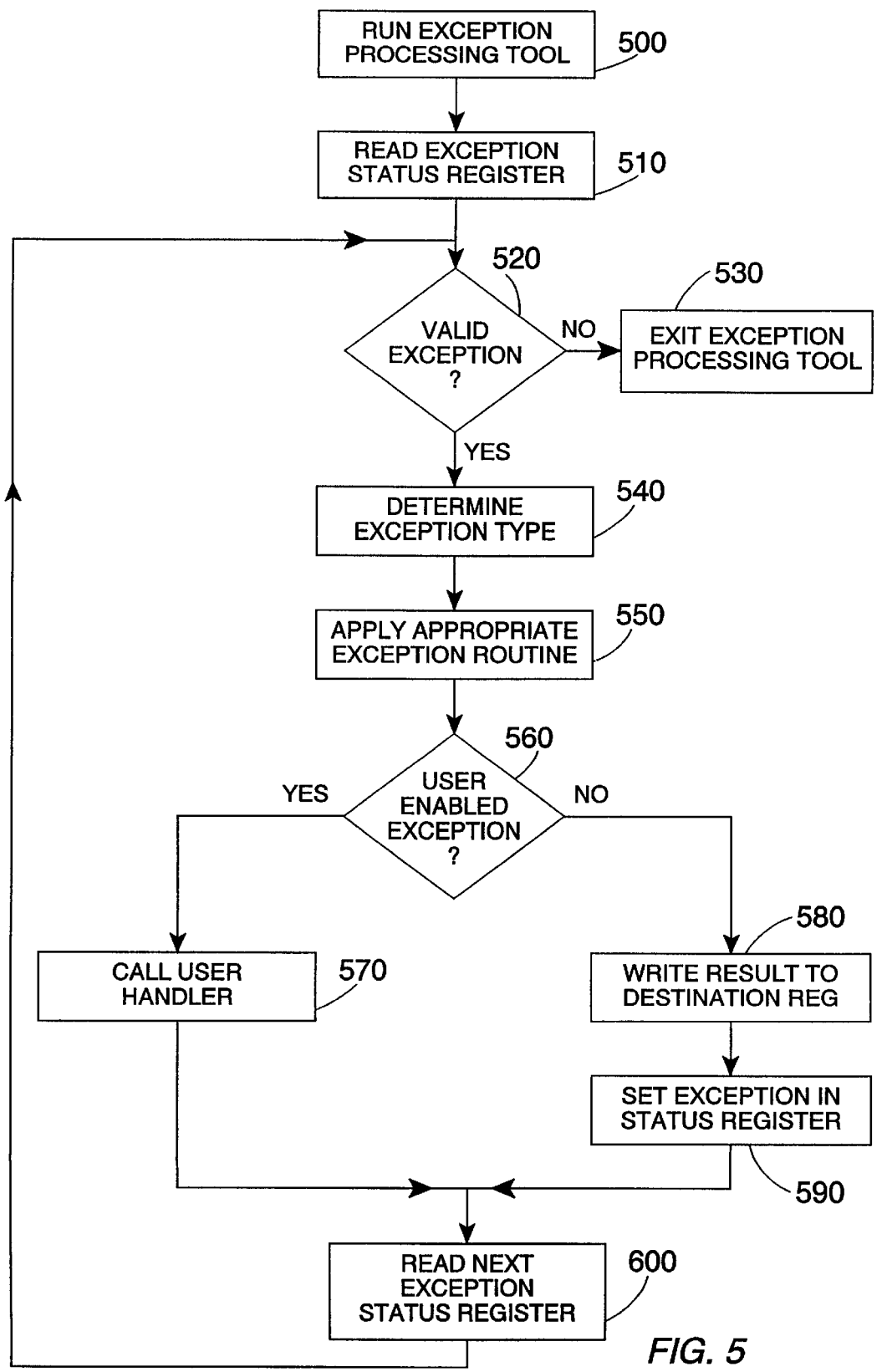
FIG. 5 is a flow diagram illustrating the steps performed by the exception processing tool in accordance with preferred embodiments of the present invention.

FIG. 5 is a flow diagram illustrating the steps performed by the exception processing tool in accordance with preferred embodiments of the present invention. As previously mentioned, the exception processing tool may be embodied as either software or hardware, or indeed a combination of both software and hardware. However, in preferred embodiments, the exception processing tool is formed by software support code executing on the CPU 100.

Upon receipt of an abort signal, the CPU 100 runs the software support code at step 500. The support code then reads the first exception status register 230, 320 at step 510. It is then determined at step 520 whether a valid exception is indicated by the contents of that first exception status register. This will be the case assuming an exception type has been placed in the exception register, which will at least be the case on the first iteration.

Assuming a valid exception exists, the software support code determines at step 540 the type of exception, and then applies the appropriate exception routine at step 550. In preferred embodiments, the software support code is arranged to comply with the "IEEE Standard for Binary Floating-Point Arithmetic", ANSI/IEEE Std 754–1985, The Institute of Electrical and Electronic Engineers, Inc., New York, 10017 (hereafter referred to as the IEEE 754–1985 standard), and hence at step 550 appropriate routines are applied to determine the IEEE 754–1985 specified result. Thus, as an example, if the exception is an overflow exception, then the software support code will generate a correctly signed infinity or largest finite number for the destination precision, depending on the rounding mode.

Then, at step 560, it is determined whether the type of exception being handled is a user enabled exception. In preferred embodiments, a register in the FPU 110 has a number of exception enable bits (one for each exception type) which conform to the requirements of the IEEE 754–1985 specification for handling of floating point exceptions. This enables the user to provide his/her own handling code to deal with the exception rather than generating the result specified by the IEEE 754–1985 specification. Hence, if the enable bit for the particular type of instruction is set by the user, then the process proceeds to step 570 where user handler code is called to handle the exception. However, if the enable bit is not set, the process proceeds to step 580, where the IEEE 754–1985 compliant result determined at step 550 is written into the destination register.

The IEEE 754–1985 standard requires that the user is able to determine whether any particular type of exception has occurred. Since, if the user has not set the relevant enable bit in the register, then the handling of such exceptions is effectively transparent to the user, a further set of exception status bits are also provided in the register which are set when the support code deals with each particular exception type. Hence, at step 590, the relevant exception status bit is set. For example, if an overflow exception is handled by the support code and the standard IEEE 754–1985 result is stored in the destination register, then the exception status bit for an overflow exception is set in the register. Hence, if the user later queries the register, he/she will see that an overflow exception has occurred.

After the above steps have taken place, the process proceeds to step 600, where the next exception status register is read. Then the process returns to step 520, where it is determined whether a valid exception exists. If so, the process is repeated until all exceptions stored in the exception status registers have been dealt with. In preferred embodiments, as soon as an exception register is read having no valid exception, the process proceeds to step 530, where the software support code is exited, and normal processing is resumed. In preferred embodiments, as discussed earlier, the FPU resumes processing with the instruction that caused the abort signal to be issued by the FPU (i.e. the first instruction that arrived after the initial exception was detected).

Although a particular embodiment of the invention has been described herewith, it will be apparent that the invention is not limited thereto, and that many modifications and additions may be made within the scope of the invention. For example, although the preferred embodiment has been described in relation to a CPU with a physically separate coprocessor, this need not be the case. For example, the floating point unit may be provided within the main processor. Further, the above-discussed register files, exception status registers, and any other registers used by the coprocessor need not be located within the coprocessor, but could be provided at any other suitable location within the data processing apparatus. In addition, various combinations of the features of the following dependent claims could be made with the features of the independent claims without departing from the scope of the present invention.

What is claimed is:

1. A data processing apparatus, comprising:

an execution unit comprising a plurality of pipelined stages for executing instructions, such that a maximum of 'n' instructions can executed simultaneously within the execution unit, where 'n' is a positive integer;

a set of at least 'n' logical exception registers, each exception register being capable of storing a number of exception attributes associated with an instruction for which an exception has been detected during execution by the execution unit, wherein the attributes are used to identify exception type and provide sufficient information to enable an exception processing tool to subsequently complete the instruction;

in the event of an exception being detected during execution of a first instruction, the execution unit being arranged: (i) to store in a first of said exception registers said exception attributes associated with said first instruction; (ii) to continue executing any remaining instructions already in the pipelined stages at the time the exception was detected, and (iii) to store in said exception registers the exception attributes associated with any of said remaining instructions for which an exception is detected during execution;

a detector for detecting when a further instruction passed to said execution unit following detection of said exception in said first instruction and for providing an exception signal causing an exception processing tool to be invoked;

whereby the exception attributes stored in the exception registers are provided to said exception processing tool for use in recovering from any exceptions occurring during processing of said first instruction and said remaining instructions.

2. A data processing apparatus as claimed in claim 1, further comprising an exception processing tool for receiving the exception attributes from the exception registers, and for applying predetermined operations to recover from said exceptions arising during processing of said first instruction and said remaining instructions.

3. A data processing apparatus as claimed in claim 1, further comprising an exception processing tool for receiving the exception attributes from the exception registers, and for applying predetermined operations to recover from said exceptions arising during processing of said first instruction and said remaining instructions, wherein when the exception processing tool has completed said predetermined operations, the execution unit is arranged to begin processing instructions with said further instruction.

4. A data processing apparatus as claimed in claim 1, further comprising a set of data registers for storing source data required by the execution unit to execute said instructions and result data determined after executing said instructions.

5. A data processing apparatus as claimed in claim 2, further comprising a set of data registers for storing source data required by the execution unit to execute said instructions and result data determined after executing said instructions, the exception processing tool being arranged to overwrite any result data stored by the execution unit upon executing an instruction for which an exception is detected with corrected data determined by the exception processing tool.

6. A data processing apparatus as claimed in claim 1, further comprising a decoder for decoding an instruction to be executed by the execution unit, and for passing the decoded instruction to the execution unit.

7. A data processing apparatus as claimed in claim 1, further comprising a main processor and a coprocessor, the coprocessor comprising said execution unit and said set of exception registers, and being arranged to execute instructions received from the main processor.

8. A data processing apparatus as claimed in claim 7, wherein following detection of said exception in said first instruction, said coprocessor is arranged to issue an exception signal to the main processor when the main processor next sends an instruction to the coprocessor for execution, the exception signal causing the main processor to invoke said exception processing tool.

9. A data processing apparatus as claimed in claim 8, wherein said exception processing tool is embodied as exception support code executed by the main processor.

10. A data processing apparatus as claimed in claim 7, wherein the coprocessor is a floating point unit.

11. A data processing apparatus as claimed in claim 1, wherein said exception is an overflow exception to indicate that the data result of the instruction as determined by the execution unit exceeds a predetermined numerical range, and the exception attributes stored in the exception register identify at least an exception type and said data result.

12. A data processing apparatus as claimed in claim 1, wherein said exception is an underflow exception to indicate that the data result of the instruction as determined by the execution unit is less than a predetermined numerical range, and the exception attributes stored in the exception register identify at least an exception type, said data result and any additionally required rounding bits.

13. A data processing apparatus as claimed in claim 1, wherein said exception is an invalid operation exception, and the exception attributes stored in the exception register identify at least an exception type, the operation type of the instruction, and the source data for the instruction.

14. A data processing apparatus as claimed in claim 1, wherein said exception is an unsupported operand exception, and the exception attributes stored in the exception register identify at least an exception type, the operation type of the instruction, and the source data for the instruction.

15. A data processing apparatus as claimed in claim 1, wherein said exception is a divide by zero exception to indicate that the instruction is seeking to divide a number by zero, and the exception attributes stored in the exception register identify at least an exception type and sign information of the source data for the instruction.

16. A method of operating a data processing apparatus, comprising the steps of:

executing instructions in a plurality of pipelined stages of an execution unit, such that a maximum of 'n' instructions can be executed simultaneously within the execution unit, where 'n' is a positive integer;

providing at least 'n' logical exception registers, each exception register being capable of storing a number of exception attributes associated with an instruction for which an exception has been detected during execution by the execution unit;

storing in a first of said exception registers said exception attributes associated with a first instruction for which an exception has been detected during execution of said first instruction;

continuing execution of any remaining instructions already in the pipelined stages at the time said exception was detected;

storing in said exception registers the exception attributes associated with any of said remaining instructions for which an exception is detected during execution;

detecting an instruction passed to said execution unit following detection of said exception in said first instruction and invoking an exception processing tool;

providing the exception attributes stored in the exception registers to said exception processing tool for use in recovering from any exceptions occurring during processing of said first instruction and said remaining instructions.

17. A data processing apparatus, comprising:

an execution unit comprising a plurality of pipelined stages for executing instructions, such that a maximum of 'n' instructions can be executed simultaneously within the execution unit, where 'n' is a positive integer;

a set of at least 'n' logical exception registers, each exception register being capable of storing a number of exception attributes associated with an instruction for which an exception has been detected during execution by the execution unit, said exception attributes identifying the exception type and including sufficient additional information so as to enable an exception processing tool to subsequently complete the instruction;

wherein, in the event of an exception being detected during execution of a first instruction, the execution unit being arranged: (i) to store in a first of said exception registers said exception attributes associated with said first instruction; (ii) to continue executing any remaining instructions already in the pipelined stages at the time the exception was detected, and (iii) to store in said exception registers the exception attributes associated with any of said remaining instructions for which an exception is detected during execution;

a detector of a further instruction passed to said execution unit following detection of said exception in said first instruction and providing an exception signal causing an exception processing tool to be invoked;

whereby the exception attributes stored in the exception registers are provided to said exception processing tool for use in recovering from any exceptions occurring during processing of said first instruction and said remaining instructions.

18. A method of operating a data processing apparatus, comprising the steps of:

executing instructions in a plurality of pipelined stages of an execution unit, such that a maximum of 'n' instructions can be being executed simultaneously within the execution unit, where 'n' is a positive integer;

providing at least 'n' logical exception registers, each exception register being capable of storing a number of exception attributes associated with an instruction for which an exception has been detected during execution by the execution unit, said exception attributes identifying the exception type and including sufficient additional information so as to enable an exception processing tool to subsequently complete the instruction;

storing in a first of said exception registers said exception attributes associated with a first instruction for which an exception has been detected during execution of said first instruction;

continuing execution of any remaining instructions already in the pipelined stages at the time said exception was detected;

storing in said exception registers the exception attributes associated with any of said remaining instructions for which an exception is detected during execution;

detecting an instruction passed to said execution unit following detection of said exception in said first instruction and invoking said exception processing tool;

providing the exception attributes stored in the exception registers to said exception processing tool for use in recovering from any exceptions occurring during processing of said first instruction and said remaining instructions.

* * * * *